US012606095B2

(12) United States Patent
Su

(10) Patent No.: US 12,606,095 B2
(45) Date of Patent: Apr. 21, 2026

(54) MULTI-PURPOSE SPARE TIRE RACK

(71) Applicant: Guixia Su, Xiamen (CN)

(72) Inventor: Guixia Su, Xiamen (CN)

(73) Assignee: Guixia Su, Xiamen (CN)

( * ) Notice: Subject to any disclaimer, the term of this patent is extended or adjusted under 35 U.S.C. 154(b) by 0 days.

(21) Appl. No.: 19/221,581

(22) Filed: May 29, 2025

(65) Prior Publication Data

US 2025/0376120 A1    Dec. 11, 2025

(30) Foreign Application Priority Data

Jun. 6, 2024    (CN) .......................... 202421290672.6

(51) Int. Cl.
B60R 9/00          (2006.01)
A47B 81/00         (2006.01)

(52) U.S. Cl.
CPC .............. B60R 9/00 (2013.01); A47B 81/007 (2013.01)

(58) Field of Classification Search
CPC . B60R 9/00; A47B 81/007; A47F 7/04; A47F 5/08; B62D 43/06; B62D 43/08; B62D 43/00; B62D 43/10; B62D 43/02; B60P 7/0807; Y10T 70/5987; Y10T 70/5858; Y10T 29/49947; Y10T 29/49963; Y10T 403/368
See application file for complete search history.

(56) References Cited

U.S. PATENT DOCUMENTS

| | | | | | |
|---|---|---|---|---|---|
| 3,990,618 A | * | 11/1976 | Shattuck | ................ | B62D 43/08 |
| | | | | | 211/23 |
| 4,013,203 A | * | 3/1977 | McCauley | ............. | B62D 43/02 |
| | | | | | 224/403 |
| 4,076,158 A | * | 2/1978 | Barr | ........................ | B62D 43/08 |
| | | | | | 224/403 |
| 4,225,066 A | * | 9/1980 | Barr | ........................ | B62D 43/08 |
| | | | | | 224/42.25 |
| 4,366,923 A | * | 1/1983 | Koch | ..................... | B62D 43/08 |
| | | | | | 224/403 |
| 4,387,837 A | * | 6/1983 | Carr | ........................ | B62D 43/08 |
| | | | | | 224/403 |
| 4,498,614 A | * | 2/1985 | Guarr | ...................... | B60R 11/06 |
| | | | | | 224/42.13 |
| 4,915,274 A | * | 4/1990 | Oliver | .................... | B62D 43/02 |
| | | | | | 414/463 |
| 5,076,477 A | * | 12/1991 | Colgan | ................ | B62D 43/005 |
| | | | | | 206/304.1 |

(Continued)

*Primary Examiner* — Hiwot E Tefera

(57) ABSTRACT

A multi-purpose spare tire rack is provided, including a fixing frame and a fixing member, where the fixing frame is provided with a fixing portion and a protruding portion, the fixing portion is used for fixation and connection to a vehicle or a wall, the protruding portion is provided with a connecting hole, the connecting hole is provided with a limiting hole, the fixing member is inserted into the connecting hole and connected with the limiting hole, and the fixing member cooperates with the fixing frame to secure a spare tire. In the present invention, the fixing frame and the fixing member can be assembled and disassembled, which solves the technical problem existing in the prior art that the integrated configuration cannot be assembled or disassembled and cannot achieve replacement of fixing members of different lengths or storage of fixing members.

7 Claims, 5 Drawing Sheets

(56) References Cited

U.S. PATENT DOCUMENTS

| | | | | |
|---|---|---|---|---|
| 6,189,749 B1 * | 2/2001 | Sato | ........................ | B62D 43/08 |
| | | | | 224/42.13 |
| 6,505,488 B1 * | 1/2003 | Princell | ................ | B62D 43/045 |
| | | | | 70/14 |
| 2005/0056763 A1 * | 3/2005 | Gates | ..................... | B62D 43/02 |
| | | | | 248/503 |
| 2013/0193178 A1 * | 8/2013 | Turner | ...................... | B60R 9/06 |
| | | | | 224/567 |
| 2015/0096947 A1 * | 4/2015 | Shaw | ........................ | A47F 7/04 |
| | | | | 211/23 |
| 2018/0208102 A1 * | 7/2018 | Dellock | ................ | B60P 7/0807 |

* cited by examiner

MULTI-PURPOSE SPARE TIRE RACK

CROSS REFERENCE TO THE RELATED APPLICATIONS

This application is based upon and claims priority to Chinese Patent Application No. 202421290672.6, filed on Jun. 6, 2024, the entire contents of which are incorporated herein by reference.

TECHNICAL FIELD

The present invention mainly relates to the technical field of automobile spare tires, specifically, to a multi-purpose spare tire rack.

BACKGROUND

In many automobile products, spare tire fixing bolts, through screw threaded pairs, are used to secure a spare wheel placed in the spare tire well. Assembly and disassembly of the spare wheel requires repeated screw tightening or loosening to fasten or remove the spare wheel, leading to use inconvenience and time and labor consumption. The existing patent application, with the application No. 201510393568.9, discloses an automobile spare tire fixing mechanism, including a spare tire fixing bolt, and further including a bolt cap and a disassembly handle, where the bolt cap presses the disassembly handle for locking on the spare tire fixing bolt. With the above structure and method, the invention has the following advantages: 1. The hook-shaped structure of the engaged end of the disassembly handle is engaged in the thread groove of the bolt body of the spare tire fixing bolt, which facilitates the rapid assembly and disassembly of the automobile spare tire in the trunk; 2. The operation is convenient, saving time and effort.

Regarding the related technologies described above, the inventors believe that when used in automobiles, they cannot achieve fixation on the wall or multi-purpose, and are impossible to timely replace different fixing members to adapt to spare tires of different sizes, and do not allow storage of fixing members, resulting in the loss of fixing members after multiple uses.

SUMMARY

To tackle the problems in the above-mentioned background, the present invention provides a multi-purpose spare tire rack.

The present invention adopts the following technical solution: a multi-purpose spare tire rack, including a fixing frame and a fixing member, where the fixing frame is provided with a fixing portion and a protruding portion, the fixing portion is used for fixation and connection to a vehicle or a wall, the protruding portion is provided with a connecting hole, the connecting hole is provided with a limiting hole, the fixing member is inserted into the connecting hole and connected with the limiting hole, and the fixing member cooperates with the fixing frame to secure a spare tire.

Preferably, the connecting hole is a hole for insertion that is wide at its upper part and narrow at its lower part and arranged at the side of the protruding portion and extending to the top of the protruding portion. The end of the hole for insertion is connected to the limiting hole.

Preferably, the connecting hole is a circular hole for insertion arranged at the top of the protruding portion, and the hole for insertion is connected to the limiting hole.

Preferably, the fixing member includes a first screw rod and a second screw rod, and the first screw rod and the second screw rod are both matched with the hole for insertion and the limiting hole. The limiting hole is a square hole, and the first screw rod and the second screw rod each are provided with a square column that fits the square hole.

The first screw rod and the second screw rod each are rotatably connected with a locking nut, a flat washer, a spring washer, a hub nut, and a wing nut. The flat washer, the spring washer, and the locking nut are in contact with the protruding portion to lock and fix the square column to fit the square hole. The hub nut and the wing nut are used to secure the spare tire placed on the spare tire rack. The protruding portion of the fixing frame is symmetrically provided with storage holes, and the storage holes allow the insertion of the first screw rod and the second screw rod. The length of the first screw rod is greater than that of the second screw rod. The first screw rod and the second screw rod have the same thread pitch and identical diameter.

Preferably, the fixing portion is provided with a through hole through which a screw is inserted for fixation and installation, which can improve the fixing effect.

Compared with the prior art, the beneficial effects of the present invention are as follows:

In the present invention, the fixing frame and the fixing member can be assembled and disassembled, which solves the technical problem existing in the prior art that the integrated configuration cannot be assembled, disassembled, or replaced, achieves the purpose of quickly replacing the fixing member, is suitable for use in fixation of spare tires of different sizes, and involves easy operation.

In the present invention, the arrangement of symmetrical storage holes on the side of the protruding portion addresses the technical problem of space occupation existing in the prior art due to failure of provision of the storage holes for receiving screw rods, which achieves the storage of screw rods. When it is not necessary to secure a tire, the fixing member can be received in the storage holes of the fixing frame, which prevents anyone from being injured by accidental collision and prevents the screw rods from being lost.

The present invention will be explained in detail below with reference to the accompanying drawings and specific embodiments.

Figure 1:
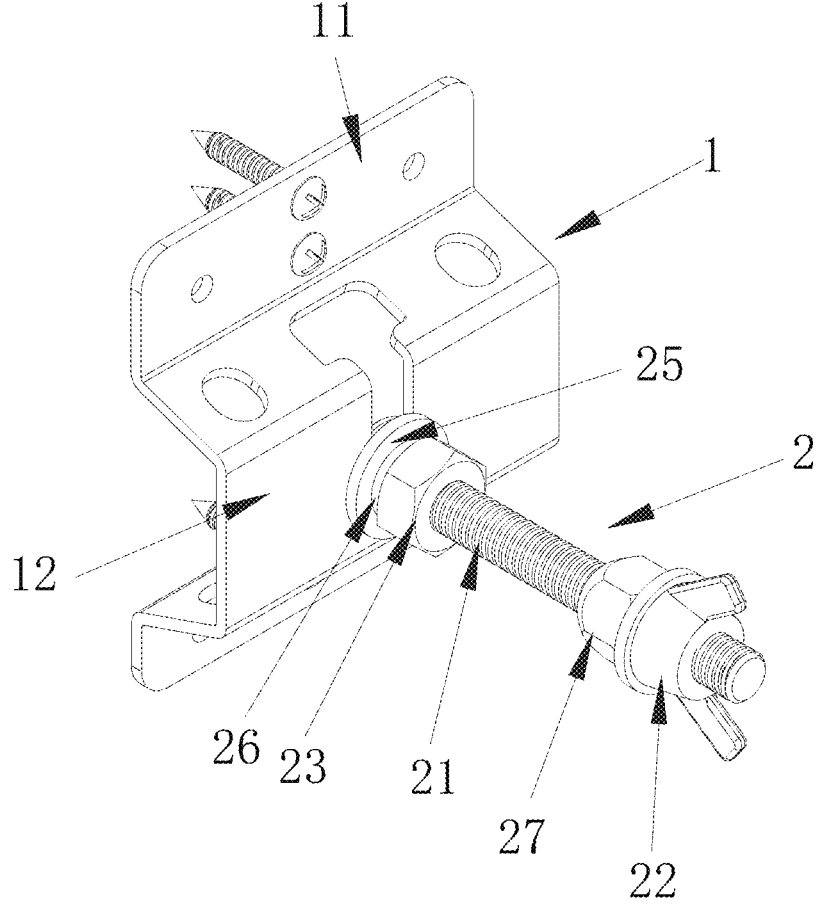
FIG. 1 is a diagram showing the overall structure of the present invention in a first use state.

In the drawings: 1, fixing frame; 11, fixing portion; 12, protruding portion; 121, connecting hole; 122, limiting hole; 123, storage hole; 2, fixing member; 21, first screw rod; 22, wing nut; 23, locking nut; 24, second screw rod.

DETAILED DESCRIPTION OF THE EMBODIMENTS

To facilitate the understanding of the present invention, the present invention will be described in more detail below with reference to the relevant drawings. Multiple embodiments of the present invention are given in the drawings, but the present invention can be implemented in different forms and is not limited to the embodiments described in the text. On the contrary, these embodiments are provided to make the content disclosed in the present invention more thorough and comprehensive.

It should be noted that when an element is described as being "fixed on" another element, it may be directly on the another element or there may be an intermediate element. When an element is considered to be "connected to" another element, it may be directly connected to the another element or there may be an intermediate element at the same time. The terms "vertical", "horizontal", "left", "right", and similar expressions used in this text are for illustrative purpose only.

Unless otherwise defined, all technical and scientific terms used herein have the same meaning as commonly understood by those skilled in the art to which the present invention belongs. The terms used in the specification of the present invention are only for the purpose of describing specific embodiments and are not intended to limit the present invention. The term "and/or" used in this text includes any and all combinations of one or more related items listed.

Referring to FIG. 1 to FIG. 5, a multi-purpose spare tire rack includes a fixing frame 1 and a fixing member 2, the fixing frame 1 is provided with a fixing portion 11 and a protruding portion 12, the fixing portion 11 is used for fixation and connection to a vehicle or a wall, the protruding portion 12 is provided with a connecting hole 121, the connecting hole 121 is provided with a limiting hole 122, and the fixing member 2 is inserted into the connecting hole 121 and connected with the limiting hole 122. The fixing member 2 cooperates with the fixing frame 1 to secure a spare tire. The fixing frame 1 and the fixing member 2 can be assembled and disassembled, which solves the technical problem existing in the prior art that the integrated configuration cannot be assembled, disassembled, or replaced, achieves the purpose of quickly replacing the fixing member 2, is suitable for use in fixation of spare tires of different sizes, and involves easy operation.

Figure 2:
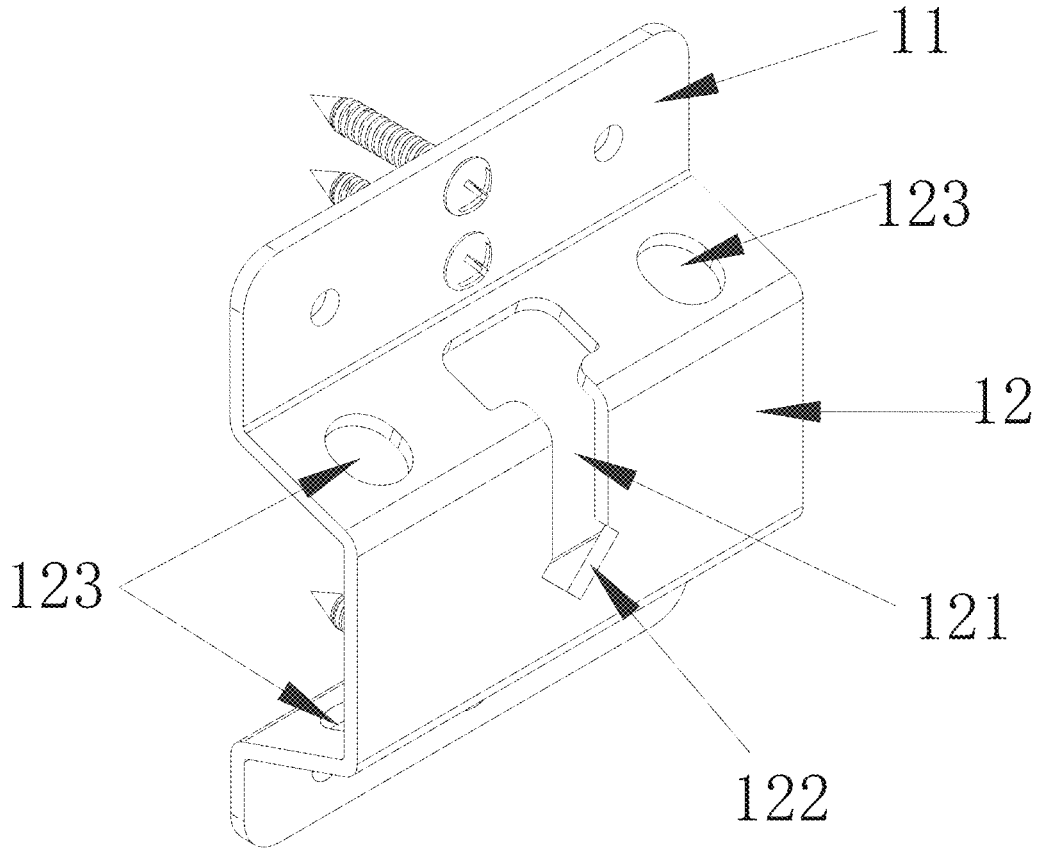
FIG. 2 is a first schematic diagram showing the structure of the fixing frame of the present invention.
Figure 3:
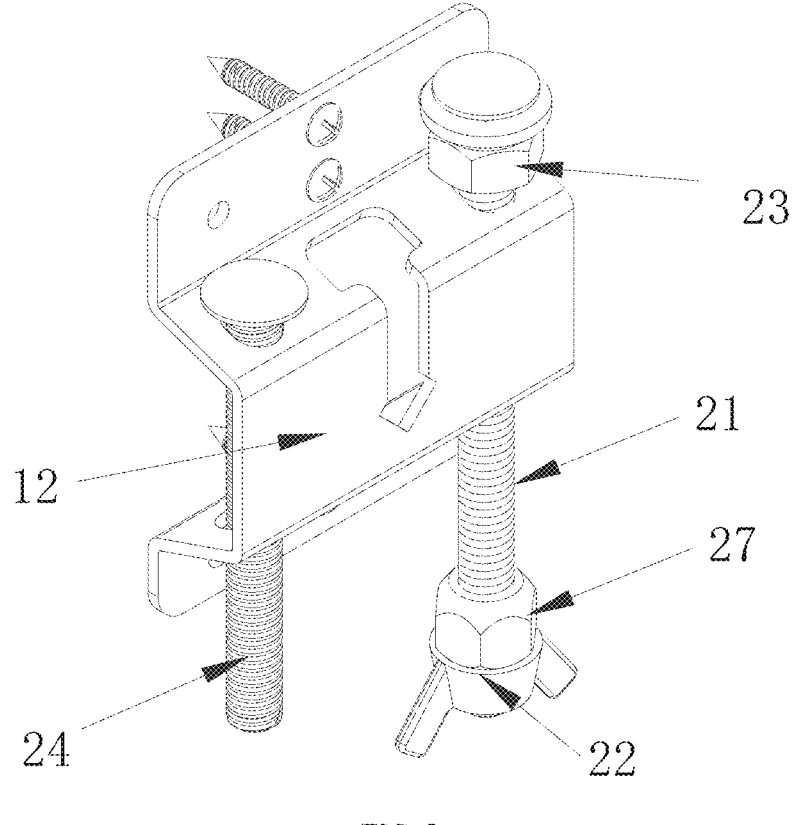
FIG. 3 is a diagram showing the overall structure of the present invention in a storage state.
Figure 4:
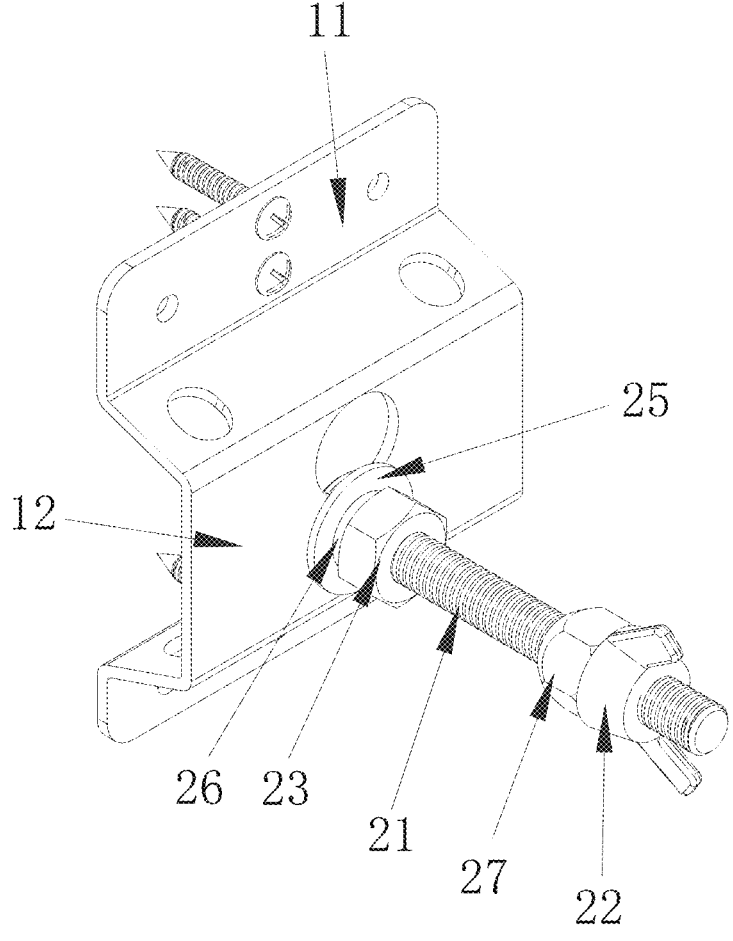
FIG. 4 is a diagram showing the overall structure of the present invention in a second use state.
Figure 5:
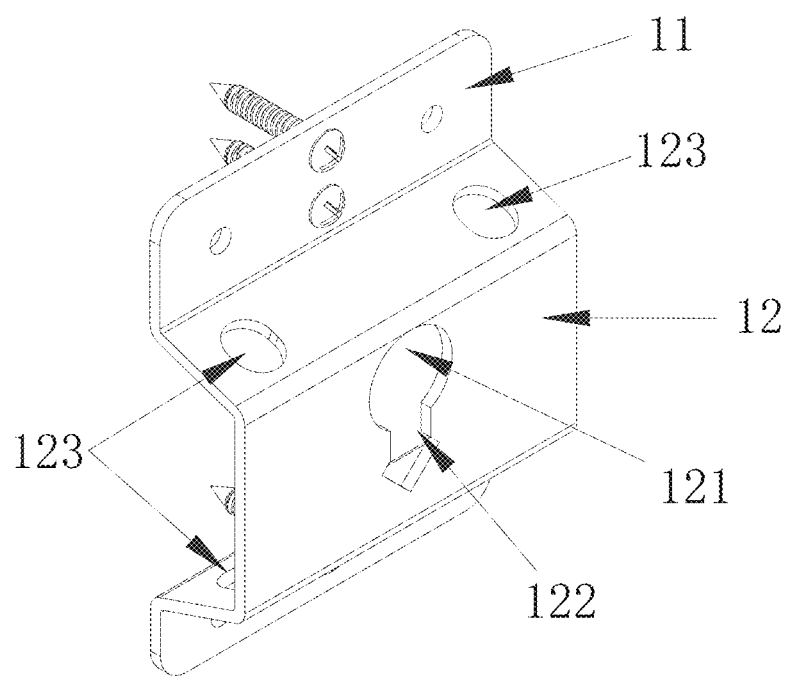
FIG. 5 is a second schematic diagram showing the structure of the fixing frame of the present invention.

In the present invention, the connecting hole 121 is a hole for insertion that is wide at its upper part and narrow at its lower part and arranged at the side of the protruding portion 12 and extending to the top of the protruding portion 12 (as shown in FIG. 2) or a circular hole for insertion that is arranged at the top of the protruding portion 12 (as shown in FIG. 5). The end of the hole for insertion is connected to the limiting hole 122. The fixing member 2 includes a first screw rod 21 and a second screw rod 24, and the first screw rod 21 and the second screw rod 24 are both matched with the hole for insertion and the limiting hole 122. The limiting hole 122 is a square hole, and the first screw rod 21 and the second screw rod 24 each are provided with a square column that fits the square hole adjacent to a nut; the first screw rod 21 and the second screw rod 24 each are rotatably connected with a locking nut 23, a wing nut 22, a flat washer 25, an anti-loosening spring washer 26, and a hub nut 27. The locking nut 23, the flat washer 25, and the anti-loosening spring washer 26 are in contact with the protruding portion 12 to lock and fix the square column to fit the square hole. The wing nut 22 is used to secure the spare tire placed on the spare tire rack. The protruding portion 12 of the fixing frame 1 is symmetrically provided with storage holes 123, and the storage holes 123 allow the insertion of the first screw rod 21 and the second screw rod 24. The length of the first screw rod 21 is greater than that of the second screw rod 24. The first screw rod 21 and the second screw rod 24 have the same thread pitch and identical diameter. The arrangement of symmetrical storage holes 123 on the side of the protruding portion 12 addresses the technical problem of space occupation existing in the prior art due to failure of provision of the storage holes 123 for receiving screw rods, which achieves the storage of screw rods and avoids the loss of screw rods.

In the present invention, the fixing portion 11 is provided with a through hole through which a screw is inserted for fixation and installation, which can improve the fixing effect.

The principle of implementing the multi-purpose spare tire rack of the present invention is as follows:

When in use, the screw is passed through the through hole of the fixing portion 11 to be fixedly connected to a vehicle or a wall. The first screw rod 21 and the second screw rod 24 of different lengths are selected according to the thickness of the spare tire. Then, the corresponding first screw rod 21 or second screw rod 24 is inserted into the hole for insertion that is wide at its upper part and narrow at its lower part and slides into the square hole (the corresponding first screw rod 21 or second screw rod 24 is inserted into the circular hole for insertion and slides into the square hole), so that the square column and the square hole are fitted and connected. The locking nut 23 is rotated to lock and fix the square column and the square hole for tight connection to ensure the stability of the connection of the first screw rod 21 or the second screw rod 24. Subsequently, the spare tire is placed on the protruding portion 12 of the fixing frame 1, followed by rotating the wing nut 22 to secure the spare tire.

When not in use, the first screw rod 21 and the second screw rod 24 are inserted into different storage holes 123 to prevent the first screw rod 21 and the second screw rod 24 from falling and being lost.

The above is an exemplary description of the present invention in combination with the accompanying drawings. Obviously, the specific implementation of the present invention is not limited to the above-mentioned method. Non-substantial improvements made by adopting the methodological concept and technical solution of the present invention or direct use of the methodological concept and technical solution of the present invention to other occasions without modification all fall within the protection scope of the present invention.

What is claimed is:

1. A multi-purpose spare tire rack, comprising: a fixing frame (1) and a fixing member (2), wherein the fixing frame (1) is provided with a fixing portion (11) and a protruding portion (12), the fixing portion (11) is used for fixation and connection to a vehicle or a wall, the protruding portion (12) is provided with a connecting hole (121), the connecting hole (121) is provided with a limiting hole (122), the fixing member (2) is inserted into the connecting hole (121) and connected to the limiting hole (122), and the fixing member (2) cooperates with the fixing frame (1) to secure a spare tire;

wherein the connecting hole (121) is a hole for insertion that is wide at an upper part and narrow at a lower part and arranged at a side of the protruding portion (12) and extending to a top of the protruding portion (12), and an end of the hole for insertion is connected to the limiting hole (122).

2. The multi-purpose spare tire rack according to claim 1, wherein the fixing member (2) comprises a relatively long first screw rod (21) and a relatively short second screw rod (24), and the first screw rod (21) and the second screw rod (24) are both matched with the hole for insertion and the limiting hole (122).

3. The multi-purpose spare tire rack according to claim 2, wherein the limiting hole (122) is a square hole, and the first screw rod (21) and the second screw rod (24) each are provided with a square column that fits the square hole adjacent to a nut.

4. The multi-purpose spare tire rack according to claim 3, wherein the first screw rod (21) and the second screw rod (24) each are connected with a locking nut (23), a wing nut (22), a flat washer (25), an anti-loosening spring washer (26), and a hub nut (27); the locking nut (23), the flat washer (25), and the anti-loosening spring washer (26) are in contact with the protruding portion (12) to lock and fix the square column to fit the square hole; and the wing nut (22) and the hub nut (27) are used to secure the spare tire placed on the spare tire rack.

5. The multi-purpose spare tire rack according to claim 4, wherein the protruding portion (12) of the fixing frame (1) is symmetrically provided with storages holes (123), and the first screw rod (21) and the second screw rod (24) are inserted into the storage holes (123).

6. The multi-purpose spare tire rack according to claim 5, wherein a length of the first screw rod (21) is greater than a length of the second screw rod (24).

7. The multi-purpose spare tire rack according to claim 6, wherein the fixing portion (11) is provided with a through hole through which a screw is inserted for fixation and installation.

* * * * *